US008432366B2

(12) United States Patent
Hodges et al.

(10) Patent No.: US 8,432,366 B2
(45) Date of Patent: Apr. 30, 2013

(54) TOUCH DISCRIMINATION

(75) Inventors: Stephen E. Hodges, Cambridge (GB); Hrvoje Benko, Seattle, WA (US); Ian M. Sands, Seattle, WA (US); David Alexander Butler, Great Cambourne (GB); Shahram Izadi, Cambridge (GB); William Ben Kunz, Seattle, WA (US); Kenneth P. Hinckley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 12/396,701

(22) Filed: Mar. 3, 2009

(65) Prior Publication Data

US 2010/0225595 A1 Sep. 9, 2010

(51) Int. Cl.
*G06F 3/041* (2006.01)

(52) U.S. Cl.
USPC ........................................................ 345/173

(58) Field of Classification Search ........... 345/172–179
See application file for complete search history.

(56) References Cited

U.S. PATENT DOCUMENTS

| 6,498,590 | B1 | 12/2002 | Dietz et al. | |
|---|---|---|---|---|
| 7,479,949 | B2* | 1/2009 | Jobs et al. | 345/173 |
| 2001/0030644 | A1* | 10/2001 | Allport | 345/173 |
| 2002/0163537 | A1* | 11/2002 | Vernier et al. | 345/751 |
| 2005/0285845 | A1* | 12/2005 | Dehlin | 345/173 |
| 2006/0022956 | A1 | 2/2006 | Lengeling et al. | |
| 2006/0238517 | A1 | 10/2006 | King et al. | |
| 2007/0046643 | A1 | 3/2007 | Hillis et al. | |
| 2007/0226636 | A1* | 9/2007 | Carpenter et al. | 715/751 |
| 2007/0236478 | A1 | 10/2007 | Geaghan et al. | |
| 2008/0060856 | A1 | 3/2008 | Shahoian et al. | |
| 2009/0146951 | A1* | 6/2009 | Welland | 345/158 |
| 2010/0066667 | A1* | 3/2010 | MacDougall et al. | 345/156 |

OTHER PUBLICATIONS

Coutaz, et al., "Ontology for Multi-surface Interaction", retrieved on May 20, 2010 at <<http://citeseerx.ist.psu.edu/viewdoc/download?doi=10.1.1.109.288&rep=rep1&type=pdf>>, IOS Press, Proceedings of Human-Computer Interaction (INTERACT), 2003, pp. 447-454.

"Microsoft Surface Computer—Multi Touch Technology", retrieved on May 21, 2010 at <<http://www.knowledgebase-script.com/demo/export.php?ID=420&type=PDF>>, Microsoft Corporation, Online Demo, 2010, pp. 1-4.

* cited by examiner

*Primary Examiner* — Joseph Haley
*Assistant Examiner* — Nicholas Lee
(74) *Attorney, Agent, or Firm* — Lee & Hayes, PLLC

(57) ABSTRACT

The claimed subject matter provides a system and/or a method that facilitates distinguishing input among one or more users in a surface computing environment. A variety of information can be obtained and analyzed to infer an association between a particular input and a particular user. Touch point information can be acquired from a surface wherein the touch point information relates to a touch point. In addition, one or more environmental sensors can monitor the surface computing environment and provide environmental information. The touch point information and the environmental information can be analyzed to determine direction of inputs, location of users, and movement of users and so on. Individual analysis results can be correlated and/or aggregated to generate a inference of association between a touch point and user.

20 Claims, 10 Drawing Sheets

TOUCH DISCRIMINATION

BACKGROUND

Computing devices are utilized by virtually everyone and in many different types of contexts (e.g., personal, social, professional, and so on). For example, it is common to see people communicating (e.g., telephone calls, text messages, emails, data transfer, and so forth) no matter where that person might be located (e.g., in a supermarket, in a library, taking public transportation, and so forth). As technology advances, so does the speed of communications and the demand for increased computing power. Further, data can be transferred across the country or across the globe in a matter of seconds. Based on the increased demands for computing capabilities, people are requiring more and more resources to be available for communicating electronically, whether the communication is with friends, family, coworkers, or others.

Computing technology has evolved such that touch screens and other devices (e.g., cameras) can track a user's movements and make intelligent decisions regarding those movements. It has also become more commonplace for users to share a single computing environment and work together and/or separately within that computing environment. Since the demand for electronic computing devices is at an all time high, it is important to provide users with anytime, anywhere computing capabilities.

As people interact with various computing experiences, it might be difficult for these people to know if the computing device understood the intended interaction. For example, several interactions from several users can occur simultaneously. In such cases, input confusion can lead to unexpected results.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

In accordance with one or more examples and corresponding disclosure thereof, various aspects are described in connection with discriminating touch input from multiple users in a surface computing environment. The surface computing environment can enable a plurality of users to simultaneously provide touch input on a surface. In cases, distinguishing touch inputs among users can be crucial to create reliable and expected user interaction. Information can be obtained and analyzed to generate an inferred association between touch input and users.

According to some aspects, a surface computing environment can obtain touch input and an image of space immediately above a surface. The input and surface image can be analyzed to determine a user associated with the touch input. In addition, environmental sensors can be provided that acquire information on the surrounding environment of the surface. The environmental information can be analyzed to enhance an inference of users associated with touch points. Heuristics can be utilized to weight obtained information and inferences based upon a current context of the surface.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
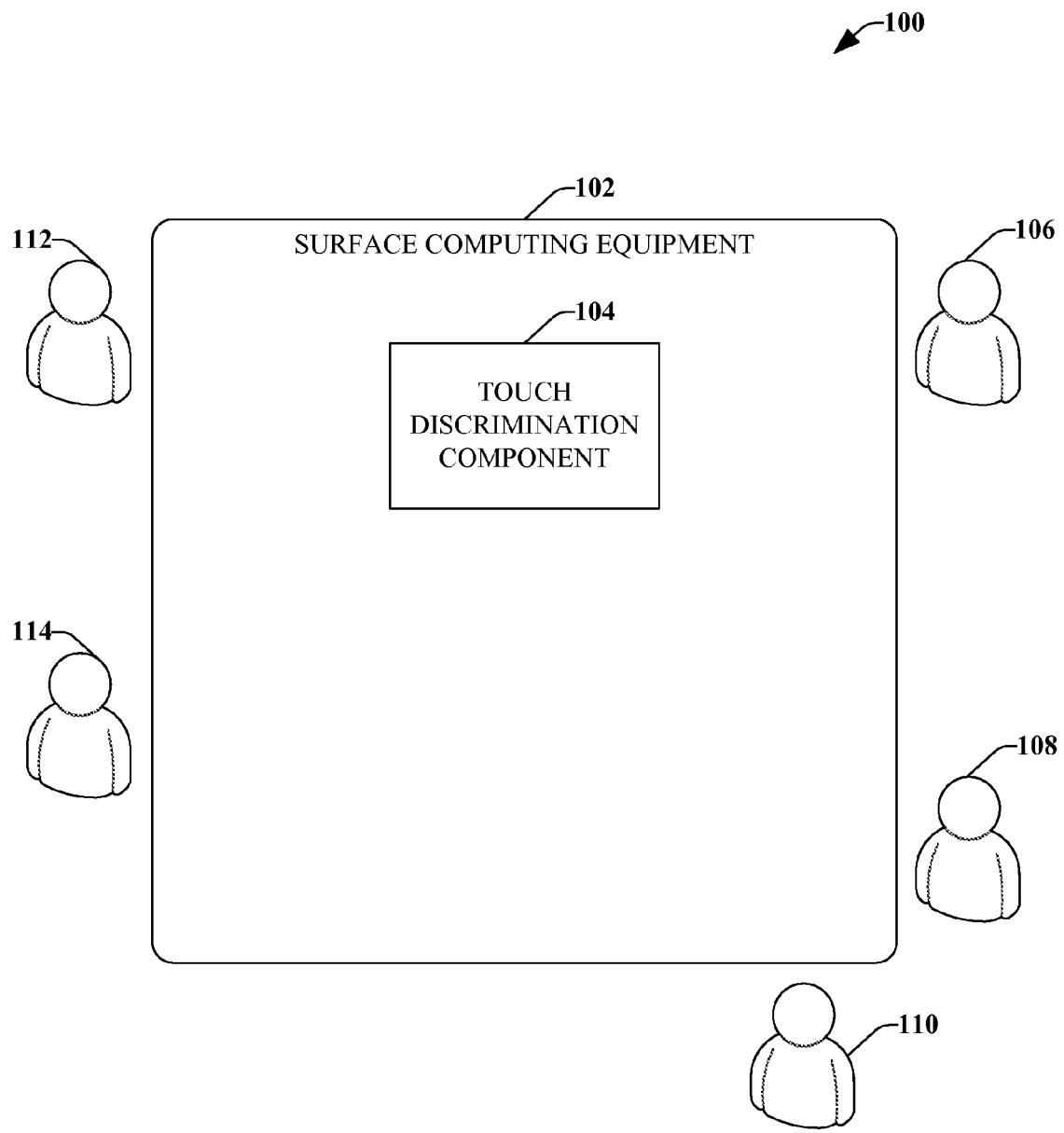
FIG. 1 illustrates a block diagram of an exemplary environment that facilitates distinguishing touch points generated by a plurality of users in a surface computing environment.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "analyzer," "store," "engine," and the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates an example environment 100 that facilitates distinguishing touch points generated by a plurality of users in a surface computing environment, according to an aspect. The disclosed aspects enable dynamic discrimination of touch input (e.g., touch points) among one or more users simultaneously interacting within a surface computing environment. Characteristics of a touch point on a surface such geometry of the touch point, binary image of immediate space above the surface, etc. can be analyzed to provide an inference of which user is associated with the touch point. In addition, environmental information can be employed to enhance the inference. Moreover, according to other aspects, a context of the surface can be utilized to select appropriate heuristics to aggregate individual inferences.

The example environment 100 can be a surface computing environment. As the trend moves to using any surface (e.g., table, wall, and so forth) as a display, there can be multiple individuals interacting with the display at substantially the same time. Further, these surface computing environments can allow users to share a single computing environment and work together and/or separately within that computing environment (e.g., classroom setting, business setting, conference, symposium, seminar, personal or family setting, and so forth).

Environment 100 includes surface computing equipment 102 (also referred to herein as surface 102) that can be provided in various formats such as, but not limited to, a table, a wall, or any other suitable surface that can be configured to provide a computing experience and/or that can be utilized as a display. In accordance with an aspect, users can interact with the equipment 102 via touching or tapping the surface (e.g., table, wall, etc.). The surface computing equipment 102 registers touch points when users interact therewith. It should be understood that although only a single (piece of) surface computing equipment 102 is illustrated (for purposes of simplicity), surface computing equipment 102 can comprise a multitude of pieces or sets of equipment (e.g., dual monitors). Further, the equipment 102 can be of different types (e.g., a surface on a table and a surface on a wall).

The surface computing equipment 102 can further allow interaction with and among a multitude of users. For example, the surface computing equipment 104 can be included in an environment 100 where a multitude of users interact, such as a meeting room, a coffee shop, and so forth. There can be any number of individuals within environment 100 interacting with surface 102. Illustrated in FIG. 1 are five users, labeled $User_1$ 106, $User_2$ 108, $User_3$ 110, $User_4$ 112, and $User_5$ 114. Although five users are illustrated, it should be understood that the disclosed aspects can be utilized with any number of users. As illustrated, the users can be positioned around the surface 102, however, in accordance with some aspects, the users can be located anywhere within the environment 100 (e.g., standing in the back of a room, sitting against a wall (not at the table), and so forth). Further, the users 106-114 can change positions (e.g., walk around, pace back and forth, etc.) as the users interact with the environment 100 and with others (e.g., other users 106-114) within the environment 100.

The surface 102 can include a touch discrimination component 104 that distinguishes touch input from users 106-114 and associates touch input with individual users. With multiple users interacting with the surface 102 at substantially the same time and in close proximity, the surface 102 can process inadvertent touches. The touch discrimination component 104 can associate touches with particular users to enable the surface 102 to disregard inadvertent or inconsistent input. For instance, user 112 can interact with surface 102 while user 114 provides touch input on a region of surface 102 associated with an application or data accessed by user 112. To avoid unexpected results, surface 102 can ignore touch input not associated with user 112 within that region of interaction. For example, user 112 can be engaged in a single player game, browsing music, videos, documents, etc., or employing some other application available within environment 100. An inadvertent or unintentional touch point originating from user 114 can disrupt user's 112 computing experience, if the touch point is processed and accepted by the surface 102. Accordingly, the touch discrimination component 104 can distinguish touch points of user 112 from touch points of 114 such that user's 114 input can be ignored within a context of user's 112 interactions.

Pursuant to another aspect, the touch discrimination component 104 can enhance user interactions between both the surface 102 and other users. For instance, users 108 and 110 illustrated at a corner of surface 102 can be interacting with each other and the surface 102. For example, users 108 and 110 can be engaged in a multi-player game or other multi-user activity, such as a game of Tic-Tac-Toe. Discrimination of touch input between user 108 (e.g., X) and user 110 (e.g., O) can ensure proper functioning of the game. In accordance with some aspects, the touch discrimination component 104 can analyze touch input as well as images of objects immediately above the surface (e.g., hands, wrists, arms, and so forth) to infer an origin of the touch input (e.g., associate input with a user). In addition, the touch discrimination component 104 can utilize environmental information around surface 102 gathered by one or more environment sensors (not shown). The environmental sensors can include various imaging devices (e.g., cameras, infrared imagers), ranging devices, biometric devices, facial recognition devices, motion detectors and the like.

The touch discrimination component 104 can employ heuristics, data aggregation and weightings to generate an inference. In an aspect, the heuristics and weightings can be a function of context of the surface 102. For instance, size of surface 102, shape of surface 102, number of users, location of users, applications executing on surface 102, location of surface 102 and so forth, can be contextual parameters considered by the touch discrimination component 104. For example, surface 102 can be large (e.g., conference room table) such that a user on one side is physically incapable of reaching across to touch the surface on another side. In another illustration, the surface 102 can be small (e.g., laptop display) such that a probability of multiple users is unlikely. It is to be appreciated that a variety of other contextual parameters can be acquired and analyzed to weight information and enhance inferring an association between users and touch points.

Figure 2:
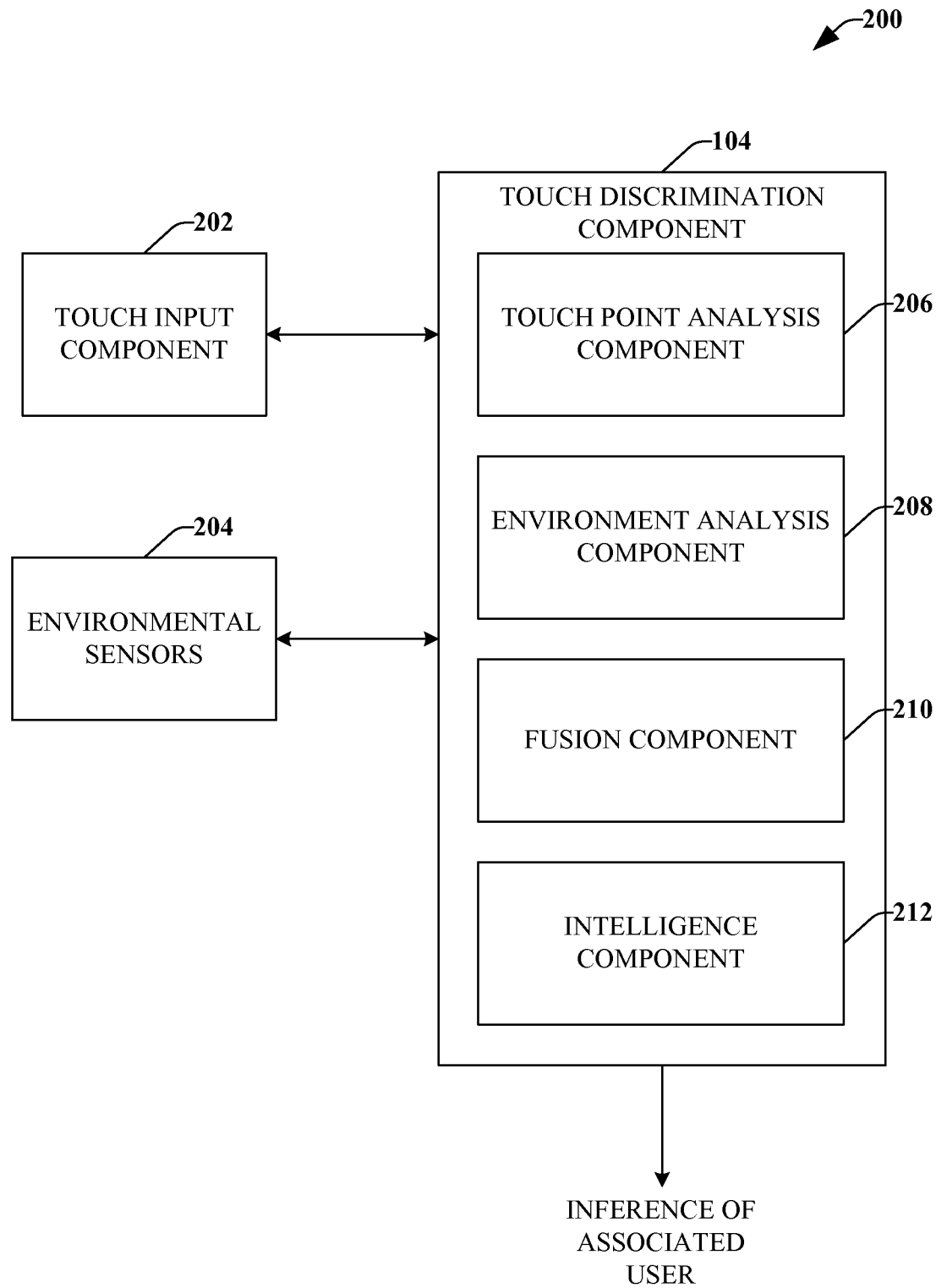
FIG. 2 illustrates a block diagram of an exemplary system that facilitates utilizing touch input information and environmental sensors to generate inferences on users associated with touch points.

FIG. 2 illustrates a system 200 that facilitates utilizing touch input information and environmental sensors to generate inferences on users associated with touch points. System 200 can be included in a surface computing environment (e.g., environment 100 of FIG. 1) that can be located in a variety of places (e.g., store, office, coffee shop, library, and so forth). System 200 can be embodied, for example, within a surface (e.g., surface 102 of FIG. 1).

System 200 includes a touch discrimination component 104 that can generate an inference on a user associated with a particular touch point (e.g., touch input on a surface). The touch discrimination component 104 can be substantially similar to and include substantially similar features and functions as component 104 described above with reference to FIG. 1. The touch discrimination component 104 can generate the inference based at least in part on information provided by a touch input component 202 and/or environmental sensors 204.

The touch discrimination component 104 can include a touch point analysis component 206 that can infer a user associated with a touch point obtained by the touch input component 202. The touch input component 202 can obtain and retain input information provided to a surface (e.g., surface computing equipment 102 of FIG. 1) by one or more users. According to an aspect, the touch input component 202 can acquire a location of a touch point on a surface (e.g., coordinates on a XY axis or other suitable coordinate system), an image of objects and shadows immediately above the surface, a shape of the touch point and the like. The touch point analysis component 206 can utilize the information acquired by the touch input component 202 to infer a direction of origination of the touch point. For example, the touch point analysis component 206 can determine a vector of incidence of the touch point. For instance, the touch point analysis component 206 can determine that a touch point is generated by an object (e.g., finger) touching the surface from a particular direction and at a particular angle relative to the plane of the surface.

Pursuant to another illustration, the touch input component 202 can obtain an image or picture of a region of space immediately above the surface and surrounding the touch point. The image, for example, can be a brightness gradient that captures brightness of objects above the surface. For instance, the touch point (e.g., the portion physically contacting the surface) can be a brightest portion while objects progressively farther away from the surface are dimmer until a visibility limit of the touch input component 202 is reached. According to other aspects, the touch input component 202 can obtain a video image of the touch point. Thresholds can be applied to the video image to generate a binary image. The touch input analysis component 206 can apply a variety of thresholds (e.g., apply thresholds at different levels) to the video image based upon brightness of portions of the image and/or apparent distance from the surface. In accordance with an illustration, the generated binary image can depict one or more binary blobs (e.g., areas of darkness surrounded by areas of white). The touch input analysis component 206 can employ connected components analysis to determine which blobs are connected (e.g., form portions of a same user). For instance, the touch input analysis component 206 can determine which fingers are connected to which hands, wrists, arms, and so forth. Once fingers, hands, wrists, arms, etc. are connected, a general direction or origin of the touch can be inferred. Accordingly, touch points can be distinguished if respective directions or origins are distinct.

The touch discrimination component 104 can also include an environment analysis component 208 that can facilitate inferring a user associated with a touch point based at least in part on environmental information obtained by environmental sensors 204. The environmental sensors 204 can gather information regarding the environmental context of the surface. According to some aspects, the environmental sensors 204 can include devices such as, but not limited to, lateral optical proximity sensors that detect presence of users beside the surface, overhead optical proximity sensors that observe the surface from above, biometric sensors that detect fingerprints or other biometrics, facial recognition sensors that determine sight lines of users, range finders, stereo imagers, shadow detectors and any other suitable environmental sensors that can facilitate detection, locating and tracking of users.

The environment analysis component 208 can analyze information acquired by environmental sensors 204 to ascertain which users originate which touch points. Pursuant to an illustration, the environment analysis component 208 can analyze data from the environmental sensors 204 when a touch point is obtained. The environment analysis component 208 can employ computer vision mechanisms on images captured by sensors to infer a user associated with the touch point. For example, an image can depict a particular user touching the surface. An inference can be made if the image correlates to location of the touch point.

According to another aspect, the touch analysis component 206 and/or the environment analysis component 208 cannot, individually, provide an accurate inference on a user associated with a touch input. However, an improved inference can be generated through combination or aggregation of determinations from the touch analysis component 206 and environment analysis component 208. The touch discrimination component 104 can include a fusion component 210 that can be utilized to take advantage of information fission which can be inherent to a process (e.g., receiving and/or deciphering inputs) relating to analyzing inputs through several different sensing modalities. In particular, one or more available inputs can provide a unique window into a physical environment (e.g., an entity inputting instructions) through several different sensing or input modalities. Because complete details of the phenomena to be observed or analyzed cannot always be contained within a single sensing/input window, there can be information fragmentation which results from this fission process. These information fragments associated with the various sensing devices can include both independent and dependent components.

The independent components can be utilized to further fill out (or span) an information space; and the dependent components can be employed in combination to improve quality of common information recognizing that all sensor/input data can be subject to error, and/or noise. In this context, data fusion techniques employed by fusion component 210 can include algorithmic processing of sensor/input data to compensate for inherent fragmentation of information because particular phenomena cannot always be observed directly using a single sensing/input modality. Thus, data fusion provides a suitable framework to facilitate condensing, combining, evaluating, and/or interpreting available sensed or received information in the context of a particular application.

In accordance with another aspect, the fusion component 210 can employ heuristics and/or weightings to customize the generated inference based up context of the surface. The fusion component 210 can consider characteristics such as, but not limited to, size of surface, shape of surface, number of users at the surface, application(s) executing on the surface, position of users around the surface and so forth. For example, the surface can be large and include only two users interacting wherein each user is located at opposite sides of the table. The fusion component 210 can weight higher determinations from the touch input component 206 due to the improbability and/or impossibility of one user reaching across a table. Pursuant to another illustration, the surface can be a bar in a pub such that users are discreetly located around the surface aligned with bar stools. A high weight can be provided to a determination that a user located a bar stool is an originator of touch input if a vector is determined in that direction. Moreover, a surface can be relatively small and subject to input from many users. In such cases, the fusion component 210 can lower determinations from top sight or other sight-based analyzers due to crowding on the surface occluding observations of touch points. It is to be appreciated that the above examples are provided for illustrative and explanative purposes and that other examples, combinations and functions can be performed in connection with applying weightings and heuristics to the aforementioned sensor information, touch inputs, analyzer results, determinations, inferences, etc., based at least in part on surface characteristics. Such examples, combinations and functions are intended to be within the scope of the subject disclosure.

System 200 further includes an intelligence component 212. The intelligence component 212 can be utilized by the touch discrimination component 104, touch input analysis component 206, environment analysis component 208 and/or fusion component 210 to distinguishing touch input and/or associating touch input with users. For example, the intelligence component 212 can infer direction of input, users associated with touch input, user touch styles and the like. Moreover, it is to be understood that the intelligence component 212 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, \ldots xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

It is to be appreciated that the system 200 can include any suitable and/or necessary interface component (not shown), which provides various adapters, connectors, channels, communication paths, etc. to integrate the touch discrimination component 104, touch input component 204 and environment sensors 206 into virtually any application, operating and/or database system(s) and/or with one another. In addition, the interface component can provide various adapters, connectors, channels, communication paths, etc., that provide for interaction with and between the touch discrimination component 104, touch input component 204, environment sensors 206, and any other device and/or component associated with the system 200.

Figure 3:
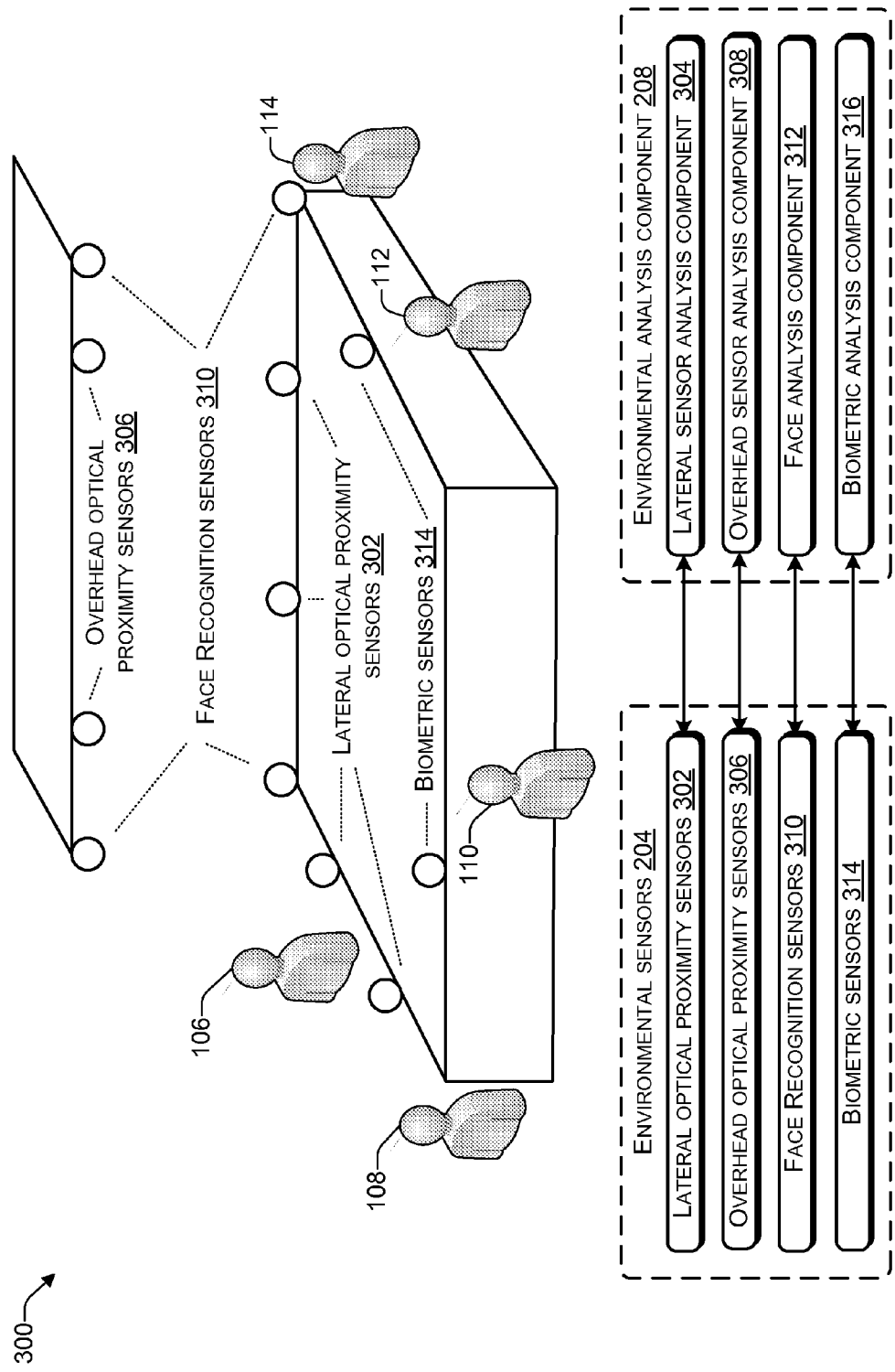
FIG. 3 illustrates a block diagram of an exemplary system that facilitates employing environmental sensors to obtain environmental context of touch points in a surface computing environment.

FIG. 3 illustrates a system 300 that facilitates employing environmental sensors to obtain environmental context of touch points in a surface computing environment. Similar to the above systems, system 300 can be utilized in a surface computing environment, such as environment 100 described with reference to FIG. 1. System 300 can include environmental sensors 204 and environment analysis component 208. It is to be appreciated that the environmental sensors 204 and environment analysis component 208 can be substantially similar and perform substantially similar functions as sensors and analysis components described supra.

The environmental sensors 204 can include lateral optical proximity sensors 302 that provide imaging and/or detection along sides or edges of a surface (e.g., surface 102). Lateral optical proximity sensors 302 can be available for touch discrimination, for example, when the surface is incorporated in a table, bar or other suitable horizontal plane. Lateral optical proximity sensors 302 can include devices such as, but not limited to, infrared (IR) imagers, visible light imagers, IR reflectors, and the like. Pursuant to an illustration, lateral optical proximity sensors 302 can emit IR pulses. When a user approaches the surface, the user reflects emitted IR pulses. Resultant IR brightness due to reflected light can be detected by sensors 302. According to another aspect, lateral optical proximity sensors 302 can acquire visible light images around edges of the surface. The images can capture users interacting with the surface. The environment analysis component 208 includes a lateral sensor analysis component 304 that evaluates information obtained by lateral optical proximity sensors 302. According to an aspect, the lateral sensor analysis component 304 can determine probable locations of users based upon lateral optical proximity information. For instance, the lateral sensor analysis component 304 can obtain high IR reflectivity (or visible light images of bodies) form the lateral optical proximity sensors 302. Based upon which sensors report high reflectivity, the lateral sensor analysis component 304 can ascertain locations of users relative to the surface. For example, the lateral sensor analysis component 304 can determine that a user is located a particular portion of the surface due to a large cluster of sensors in that area reporting high reflectivity (or image occlusion from a user's body).

The environmental sensors 204 can include overhead optical proximity sensors 306 that provide imaging and/or detection from a position above the surface and users. According to some aspect, overhead optical proximity sensors 306 can be cameras or other imaging devices that observe at least a portion of the surface and surrounding users. It is to be appreciated that overhead optical proximity sensors 306 can individually observe an entirety of the surface. Overhead optical proximity sensors 306 can observe users as they interact with the surface. The observations can be evaluated by an overhead sensor analysis component 308 included in the environment analysis component 208. The overhead sensor analysis component 308 can employ computer vision techniques as well as other video and/or image analysis mechanisms to determine which users are interacting with which portions of the surface. For example, overhead optical proximity sensors 306 can observe a user touching the surface at a particular location. The overhead sensor analysis component 308 can correlate this observation with actual touch points to facilitate touch discrimination.

The environmental sensors 204 can include face recognition sensors 310 that can detect faces of users. The face recognition sensors 310 can be configured to perform face tracking to determine a direction that a user is facing based on the location of the user's eyes. In accordance with some aspects, the face recognition sensors 310 can be configured to detect the location of a user and, specifically the user's face and/or eyes. For example, face recognition sensors 310 can be configured to periodically, constantly, or based on other intervals, scan the area and make a determination as to the location of each user. Based on the location of each user, a determination can be made whether the user is standing or sitting (e.g., based on height). Further, face recognition sensors 310 can observe the user's movements to determine which direction the user is facing (e.g., faced toward the surface, facing away from the surface, and so forth). In accordance with some aspects, the direction the user is facing can change based on the user's interactions with the surface and with other users. The environment analysis component 208 can include a face analysis component 312 that can evaluate face recognition and face tracking information obtained by the face recognition sensors 310. For example, the face analysis component 312 can infer a location at which the user is looking. For instance, a user can watch as they touch the surface. Accordingly, the face analysis component 312 can determine a line of sight of the user and extrapolate likely touch points. The extrapolated touch points can be correlated to actual touch points to facilitate distinguishing touch points among multiple users.

The environmental sensors 204 can further include biometrics sensors 314 that provide detection and/or sensing of biometric information. The biometric sensors 314 can include, for example, fingerprint detectors that obtain fingerprints associated with touch points. The environment analysis component 208 can include a biometric analysis component 316 that evaluates biometric data (e.g., fingerprints) to distinguish touch input. For example, upon receiving a touch the biometric sensor can register a fingerprint. The biometric analysis component 316 can analyze the fingerprint to determine if it matches previous input. If it matches, the touch point can be associated with that user. If a fingerprint is new, then a new user is interacting with the table. The biometric analysis component 316 and biometric sensors 314 can facilitate distinguishing touch input from a plurality of users even when users interact within a small region of a surface. If a sufficiently detailed print is obtained with a touch point, the analysis component 316 can distinguish the fingerprint from other prints. In situations with incomplete or poor fingerprint receptions (e.g., user smudges with a finger, touches with half a print, touches with a knuckle, etc.), the analysis component 316 can make an inference regarding if the fingerprint is distinct from other received contemporaneously and/or previously.

It is to be appreciated that the aforementioned sensors 302, 306, 310 and 314 and analysis components 304, 308, 312 and 316 are illustrations of possible sensors and analyzers that can be provided in connection with a surface computing environment. For example, a surface can include range finders such as radar or ultrasonic range finders in sensors 204 to detect as users approach a surface as well as a location of the user relative to the surface. In addition, a surface need not include all sensors described above. For instance, a particular surface computing environment can include lateral optical sensors only. However, it is to be appreciated that additional sensors can be added or incorporated in order to generate more environmental information from a variety of modalities. As more information around touch points is gathered, generating inferences on which touch points belong to which users becomes more defined and more accurate.

Figure 4:
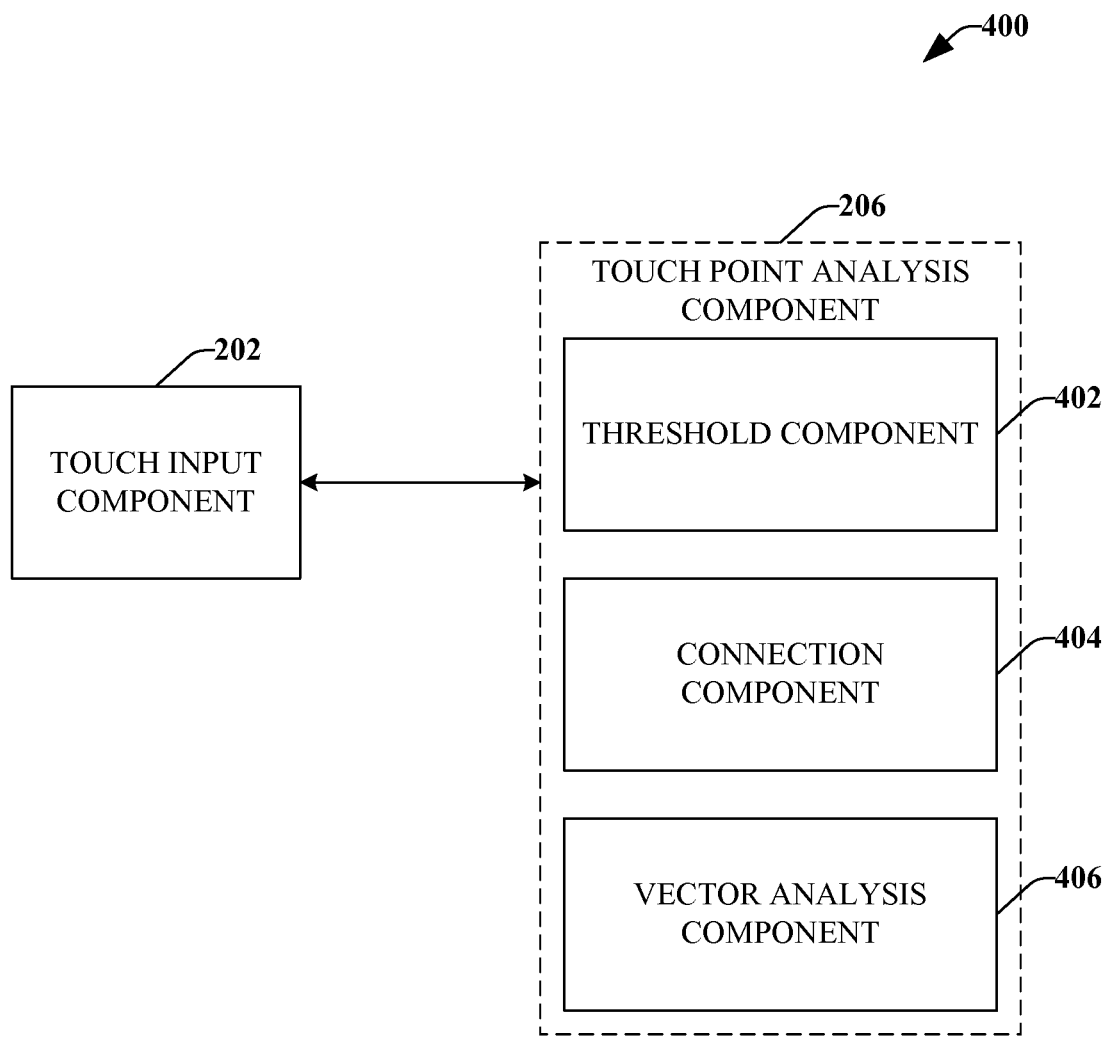
FIG. 4 illustrates a block diagram of an exemplary system that facilitates analysis of touch inputs in a surface computing environment.

FIG. 4 illustrates a system 400 that facilitates analysis of touch inputs in a surface computing environment. System 400 can be employed to enable distinguishing touch inputs from one or more users interacting simultaneously with a surface computing environment. Similar to the above systems, system 400 can be utilized in a surface computing environment, such as environment 100 described with reference to FIG. 1. System 400 can include a touch input component 202 and touch point analysis component 206. It is to be appreciated that the touch input component 202 and touch point analysis component 206 can be substantially similar and perform substantially similar functions as sensor and analysis components described supra.

The touch input component 202 can obtain information related to touch points on a surface. The information can include locations of touch points, shapes of touch points, vectors of touch points, and so on. In addition, the touch input component 202 can obtain an image or video of objects immediately above and/or in front of the surface. For instance, the surface can image objects on the surface as well as a short distance away. Accordingly, the touch input component 202 can obtain images of hands, wrists, arms, and the like hovering above a surface. The obtained information associated with touch points can be provided to touch point analysis component 206 to facilitate discriminating touch points among one or more users of the surface.

Touch point analysis component 206 includes a threshold component 402 that applies one or more thresholds to a video image obtained from the touch input component 202. Threshold component 402 generates a binary image from the video image via application of thresholds. The threshold component 402 can apply a variety of thresholds (e.g., thresholds at different levels) based upon particular criteria. For instance, the threshold component 402 can apply different thresholds to various portions of the image based upon brightness of portion of the image. In addition, the threshold component 402 can apply different thresholds to different portions based up an apparent distance from the surface. The generated binary image can depict one or more binary blobs (e.g., areas of darkness surrounded by areas of lightness). According to one aspect, the touch point analysis component 206 can receive a binary image from the touch point input component 202. The image, for example, can be a brightness gradient that captures brightness of objects above the surface. For instance, the touch point (e.g., the portion physically contacting the surface) can be a brightest portion while objects progressively farther away from the surface are dimmer until a visibility limit of the touch input component 202 is reached.

According to some aspects, the generated binary image can be analyzed through employment of connected components techniques. The touch point analysis component 206 includes a connection component 404. The connection component 404 can employ connected components analysis to determine which binary blobs are connected (e.g., form portions of a same user). For instance, the connection component 404 can determine which fingers (e.g., touch points) are connected to which hands, wrists, arms, and so forth. Once fingers, hands, wrists, arms, etc. are connected, a general direction or origin of the touch can be inferred. Accordingly, touch points can be distinguished if respective directions or origins are distinct.

In accordance with another aspect, the touch point analysis component 206 includes a vector analysis component 406. The vector analysis component 406 can determine a vector or direction of incidence of a touch point. Pursuant to an illustration, the touch input component 202 can obtain a shape and location of a touch point. The vector analysis component 406 can evaluate the shape of the touch point (e.g., shape of contact between finger and surface) to determine a direction from which the finger strikes the surface. For instance, if a user touches a surface with an index finger at an angle of 45 degrees, the contact area between the surface and finger will be stretched by a certain factor. The amount and direction of stretching can be evaluated by the vector analysis component 406 to infer a likely origination point (e.g., user) of the touch point. It is to be appreciated that a vector can be directly determined by the touch input component 202. For example, the touch input component 202, in addition to determining a location (e.g., XY coordinates) of a touch point, can also detect a force applied to a surface by a touching object. The detected force can include both magnitude and direction.

Figure 5:
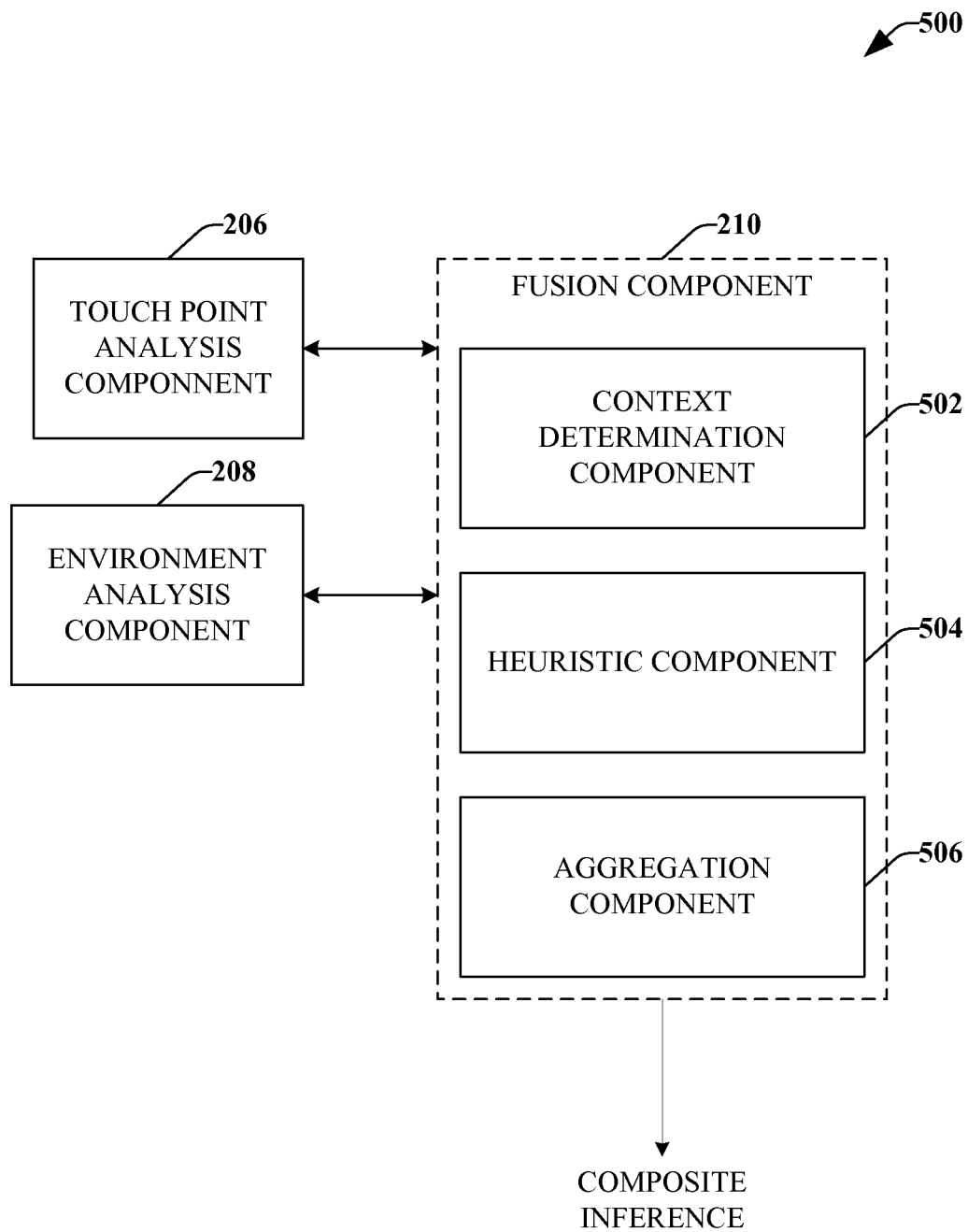
FIG. 5 illustrates a block diagram of an exemplary system that facilitates associating touch input with users based upon a context of a surface computing environment.

FIG. 5 illustrates a system 500 that facilitates associating touch input with users based upon a context of a surface computing environment. System 500 can be employed to enable distinguishing touch inputs from one or more users interacting simultaneously with a surface computing environment. Similar to the above systems, system 500 can be utilized in a surface computing environment, such as environment 100 described with reference to FIG. 1, that includes one or more surfaces. System 500 can include a touch point analysis component 206 that evaluates touch input information and an environment analysis component 208 that evaluates environment information to facilitate discrimination of touch points among one or more users. System 500 also includes a fusion component 210 that can generate a composite inference that associates touch points to users. In accordance with an aspect, the composite inference can be based upon respective inferences and/or determinations of the touch point analysis component 206 and environment analysis component 208. The fusion component 210 can determine a context of a surface and weight the inferences and/or determinations in terms of accuracy, relevancy and/or resolving ability. After weighting, the fusion component 210 can aggregate weighted information to generate a composite inference. It is to be appreciated that the touch point analysis component 206, the environment analysis component 208 and fusion component 210 can be substantially similar and perform substantially similar functions as touch point analysis components, environment analysis components and fusion components described supra with respect to FIGS. 2, 3 and 4.

In accordance with some aspect, the fusion component 210 can employ heuristics and/or weightings to customize the generated inference based up context of the surface. The fusion component 210 can consider characteristics such as, but not limited to, size of surface, shape of surface, number of users at the surface, application(s) executing on the surface, position of users around the surface and so forth. The fusion component 210 includes a context determination component 502 to ascertain a current context of a surface. The context determination component 502 can determine a set of context parameters associated with a particular surface. The set of context parameters can include one or more permanent parameters and/or transient parameters. Permanent parameters can include characteristics that are fixed upon installation, manufacturing, and/or configuration of a surface. For example, permanent parameters can include size of a surface, shape of a surface, location of a surface, and so forth. Transient parameters include characteristics that dynamically change during employment or utilization of a surface by users. For example, transient parameters can include number of users at a surface, relative position of users around a surface, application(s) executing on the surface, environmental sensors available (e.g., new sensors can be installed, old sensors decommissioned, etc.) and the like.

According to an aspect, the fusion component 210 includes a heuristic component 504 applies weightings to determinations or inferences generated by the touch point analysis component 206 and environment analysis component 208. In one aspect, the weightings can be applied based at least in part on the set of context parameters. For example, the surface can be large and include only two users interacting wherein each user is located at opposite sides of the table. The heuristic component 504 can apply higher weights from the touch input component 206 due to the improbability and/or impossibility of one user reaching across a table. Pursuant to another illustration, the surface can be a bar in a pub such that users are discreetly located around the surface aligned with bar stools. A higher weight can be provided to a determination that a user located a bar stool is an originator of touch input if a vector is determined in that direction. Moreover, a surface can be relatively small and subject to input from many users. In such cases, the heuristic component 504 can apply lower weights to determinations from top sight or other sight-based analyzers due to crowding on the surface occluding touch points.

The fusion component 210 further an aggregation component 506 that creates a cumulative or composite inference based upon weightings of determinations and/or inferences applied by the heuristic component 504. The aggregation component 506 can utilize various statistical, deductive, inferential, and/or other artificial intelligence mechanisms to combine individual determinations and inferences into the composite inference. Pursuant to an illustration, the aggregation component 506 can select a touch point-user association (e.g., inference) that is corroborated by more than one of the aforementioned analysis techniques. It is to be appreciated that other combinatorial techniques can be employed to create a composite inference based upon the set of context parameters and weightings.

Figure 6:
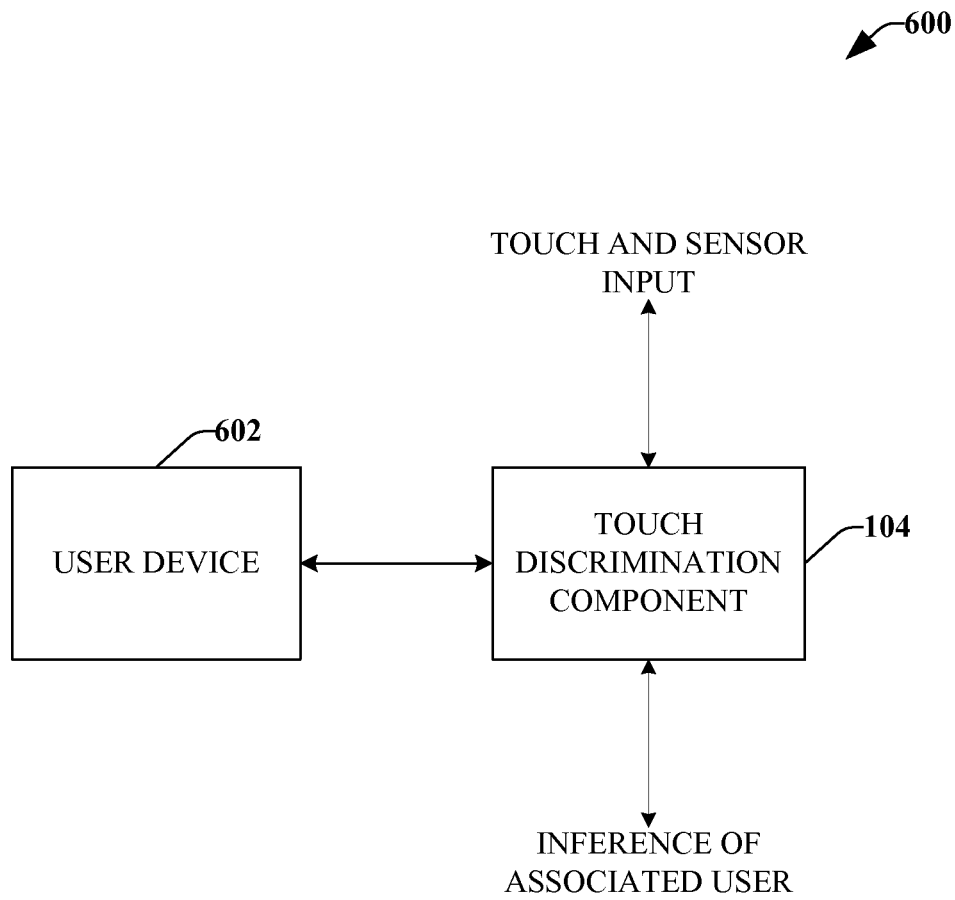
FIG. 6 illustrates a block diagram of an exemplary system that facilitates employing a user device to distinguish touch input from one or more users of a surface computing environment.

FIG. 6 illustrates a system 600 that facilitates employing a user device to distinguish touch input from one or more users of a surface computing environment. System 600 can include a touch discrimination component 104 that can obtain touch and sensor input from, for example, a surface and/or environmental sensors. The touch discrimination component 104 can evaluate the obtained input and infer a user associated with the touch input. It is to be appreciated that the touch discrimination component 104 can be substantially similar and perform substantially similar functions as touch discrimination components described above with reference to previous figures.

System 600 includes a user device 602 that can be carried, worn or otherwise possessed by a user interacting with a surface in a surface computing environment. While a single user device is depicted to simplify explanation, it is to be appreciated that a plurality of user devices can interact with the touch discrimination component 104. In addition, an individual user can utilized one or more user devices.

User device 602 can be a mobile device, an electronic device, a computing device and so forth. Moreover, the user device 602 can be a wearable object (e.g., jewelry) such as, but not limited to, a ring, bracelet, watch, pendant or the like. According to some aspects, user device 602 can include an accelerometer (not shown) that detects accelerations and/or orientations of user device 602 as a user interacts with the surface. Pursuant to an illustration, a user can be wearing a ring with the accelerometer (e.g., a three-axis accelerometer) while interacting with the surface. Accelerometer information can be transmitted to touch discrimination component 104. The touch discrimination component 104 can evaluate the accelerometer information to recreate a path of the ring and, accordingly, a path of a user's finger or hand. The path can be aggregated with touch analysis results and/or sensor analysis results to further enhance generation of a composite inference as discussed supra.

According to another aspect, the user device 602 can include electrical sensors configured to detect electrical signals transmitted in nerves and muscles of a user's body. The nerve signals can be transmitted to the touch discrimination component 104 for analysis. The touch discrimination component 104 an, for example, determine that a particular finger or hand of a user is flexing. The touch decimation component 104 can compose such results with information from environment sensors (e.g., lateral sensor systems, overhead sensor systems, and the like) to correlate muscle information with visual observation.

Figure 7:
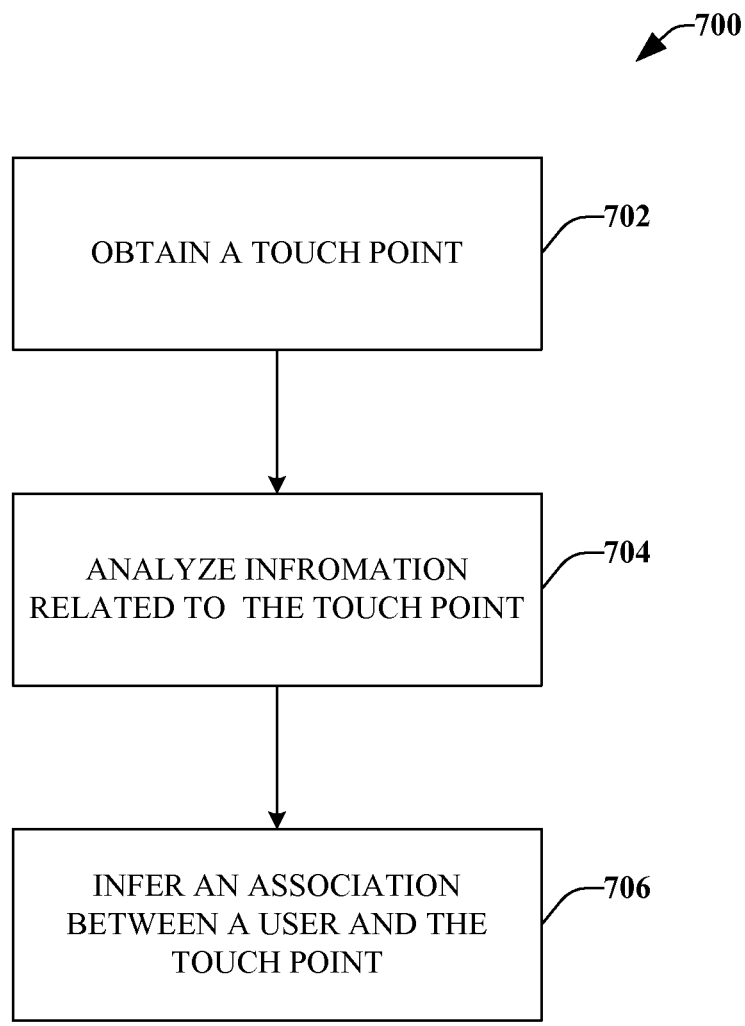
FIG. 7 illustrates an exemplary methodology that facilitates distinguishing touch inputs among one or more users of a surface computing environment.
Figure 8:
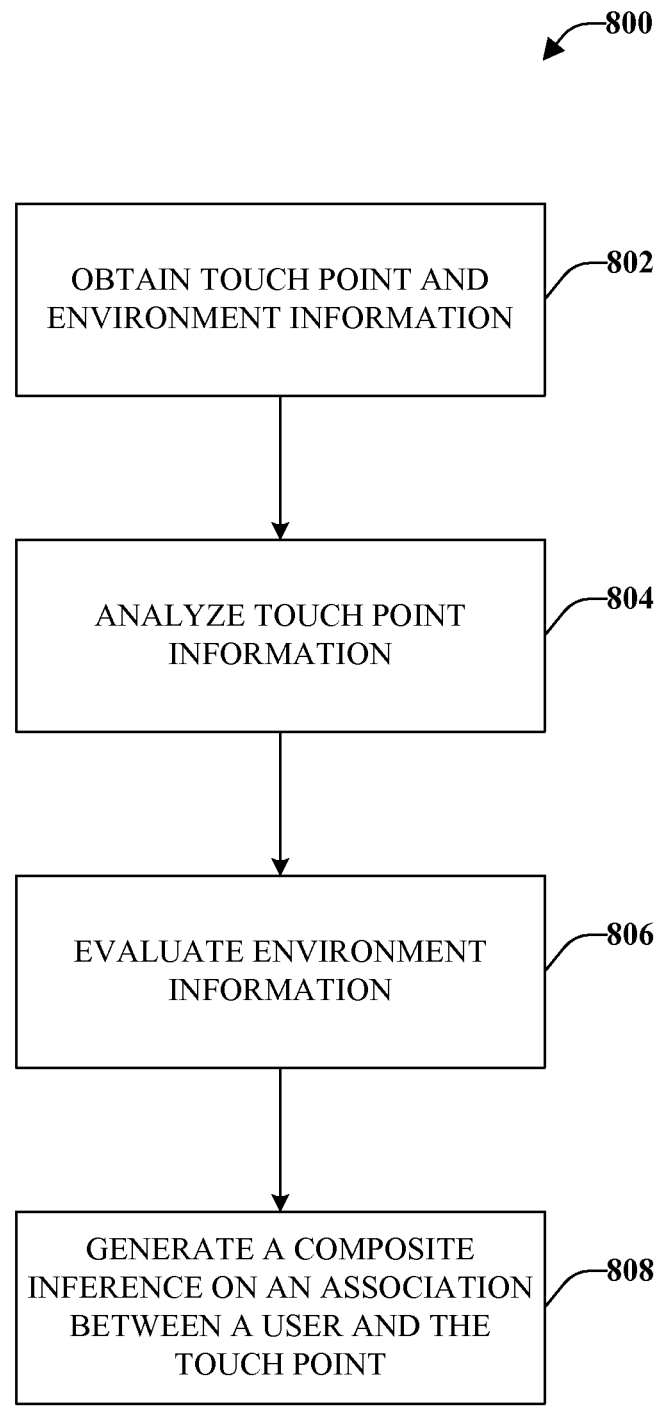
FIG. 8 illustrates an exemplary methodology that facilitates utilizing a variety of information to infer associations between users and touch input in a surface computing environment.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates distinguishing touch inputs among one or more users of a surface computing environment. At reference numeral 702, a touch point is obtained. A touch point can be generated by a user tapping, touching, pressing on a surface with a finger, hand or other suitable object (e.g., pen, stylus, etc.). At reference numeral 704, information related to the touch point is analyzed. The analyzed information can include information about the touch point (e.g., size, shape, force applied, etc.) and/or information about the context or environment surrounding the touch point. For instance, the analyzed information can include a touch input as well as images of objects immediately above the surface (e.g., hands, wrists, arms, and so forth). In addition, the analyzed information can be environmental information around a surface gathered by one or more environmental sensors. The environmental sensors can include various imaging devices (e.g., cameras, infrared imagers), ranging devices, biometric devices, facial recognition devices, motion detectors and the like.

At reference numeral 706, an association between a user and the obtained touch point is inferred. The inference can be generated at least in part on the analyzed information. For instance, shape of a touch point can be evaluated to determine a general direction in which a finger is pointing. The general direction can be backtracked to a location of user. In addition, imaging of a hand, wrist, etc. can be evaluated to associate such images with a touch point. The association can facilitate enhancing a determination of direction of input. In accordance with another example, environmental considerations can be utilized to augment inferring the association. For example, videos, images or other visual observations of users can be correlated to touch point locations to establish associations.

FIG. 8 illustrates a method 800 that facilitates utilizing a variety of information to infer associations between users and touch input in a surface computing environment. At reference numeral 802, touch point and environment information can be collected. Touch point information can include data such as, but not limited to, location of touch points, shape of touch points, images of objects and shadows above a surface, force (e.g., magnitude and directed) exerted to generate the touch point, and the like. Environment information can include data acquired by one or more environmental sensors. The sensors can include devices such as, but not limited to, lateral sensors that detect presence of users beside the surface, overhead sensors that observe the surface from above, biometric sensors that detect fingerprints or other biometrics, facial recognition sensors that determine sight lines of users, range finders, stereo imagers, shadow detectors and any other suitable environmental sensors that can facilitate detection, locating and tracking of users.

At reference numeral 804, touch point information is analyzed. In one aspect, a video image of the touch point can be thresholded to create a binary image. A connected components analysis can be utilized to connect binary blobs (e.g., fingers connected to hands, hands to wrists, wrists to arms, etc.) to discover a direction from which the touch point originates. According to another aspect, the touch information can include force measurements that indicate a vector of incidence (e.g., direction of origination) and/or a direction can be ascertained from shape of a touch point.

At reference numeral 806, environment information is evaluated. Environment information can include images and videos in visible light and/or infrared light. The information can be evaluated with computer vision mechanisms to determine locations of users around a surface. In addition, the information can be evaluated to ascertain movement of users to correlate user actions with touch points. At reference numeral 808, a composite inference on an association between a user and the touch point is generated. Pursuant to an illustration, a composite inference can be made through comparing results of touch point information analysis with results of environment information analysis.

Figure 9:
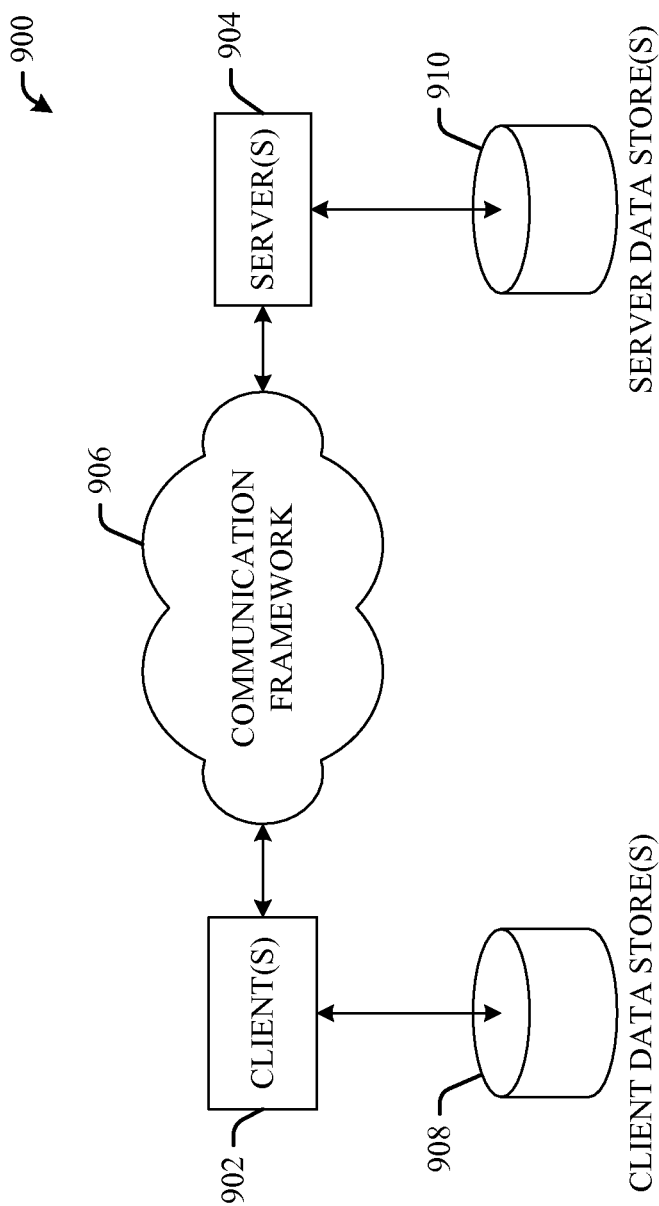
FIG. 9 illustrates an exemplary networking environment, wherein the novel aspects of the claimed subject matter can be employed.
Figure 10:
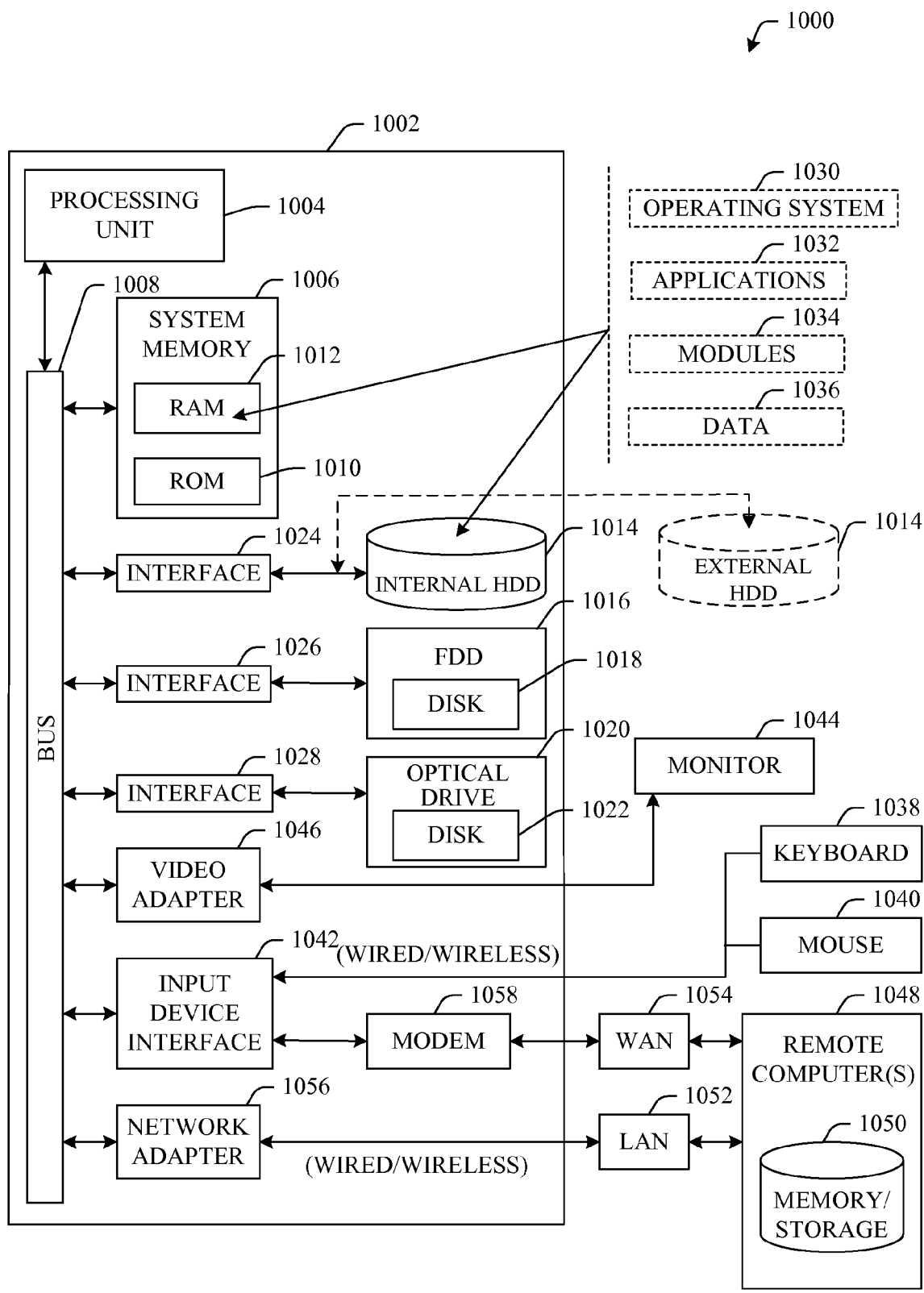
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a reflection component that generates full descriptions of static subroutines and a dynamic method component that creates dynamic subroutines at runtime based upon the descriptions, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system comprising:
   one or more processors;
   one or more computer-readable storage media including instructions executable by the one or more processors;
   a touch input component to:
      obtain touch point information from at least one surface in a surface computing environment, and
      determine a vector of incidence based on the touch point information;
   one or more sensors that collect information related to a surrounding environment of the at least one surface that is used by a plurality of users;
   a touch discrimination component to:
      infer an association between a user of the plurality of users and a touch point based on at least one of the touch point information, accelerometer information obtained from a user device associated with the user, or environmental information, and
      distinguish input received from the user relative to other users of the plurality of users;
   a biometric sensor to identify a fingerprint based on the touch point information, to determine whether the fingerprint is associated with the user, and to associate the fingerprint with a new user when the fingerprint is unassociated with the user;
   an overhead sensor analysis component to use overhead optical sensors to
      acquire overhead environmental information, and
      ascertain movements of at least one user of the plurality of users based on the overhead environmental information;
   a facial analysis component to use one or more optical imaging sensors to determine a line of sight of at least one user of the plurality of users; and
   a threshold component to apply one or more thresholds to an image when the image is included in the touch point information;
   a fusion component to apply, based on a context of the surface, weightings to the touch point information and to the environmental information.

2. The system of claim 1, further comprising a touch point analysis component that evaluates the touch point information to determine a direction from which the touch point originated.

3. The system of claim 2, the threshold component operable to generate a binary image by applying the one or more thresholds to the image.

4. The system of claim 3, further comprising a connection component that utilized connected components analysis techniques to associate portions of the binary image.

5. The system of claim 1, further comprising a vector analysis component that evaluates the touch point information to ascertain a vector of incidence associated with the touch point.

6. The system of claim 1, in which the touch point information includes at least one of a location of the touch point, a size of the touch point, a shape of the touch point, or an incoming force of the touch point.

7. The system of claim 1, further comprising an environment analysis component that evaluates the environmental information to determine a location and a movement associated with at least one user of the plurality of users.

8. The system of claim 7, further comprising a lateral sensor analysis component that evaluates side-ways environment information acquired by side-ways facing optical sensors, the lateral sensor analysis component determines a location of at least one user relative to the at least one surface.

9. The system of claim 7, in which the environment analysis component uses computer vision techniques on the overhead environmental information acquired by the overhead optical sensors to ascertain the movements.

10. The system of claim 7, in which the biometric analysis component evaluates biometric data associated with the touch point to facilitate distinguishing touch input among the plurality of users.

11. The system of claim 1, further comprising a context determination component that ascertains a set of context parameters that specify the context of the surface.

12. The system of claim 11, in which the set of context parameters includes at least one of a size of the surface, a shape of the surface, a number of users of the surface, or a number of applications receiving input from the surface.

13. The system of claim 11, further comprising a heuristic component that applies weightings to the touch point information and the environmental information in accordance with the set of context parameters.

14. The system of claim 11, further comprising an aggregation component that generates a composite inference of association from individual evaluations on the touch point information and the environmental information.

15. The system of claim 1, in which the touch discrimination component analyzes the accelerometer information obtained from a user device associated with the user to infer the association between the user and the touch point.

16. A method comprising:
   obtaining touch point information associated with a touch point generated by a user interacting with a surface of a surface-based computing environment;
   determining a vector of incidence of a touch point based on at least one of the touch point, an image of objects and shadows immediately above the surface, or a shape of the touch point;
   collecting environmental information acquired by one or more environmental sensors that monitor the surface;
   analyzing the touch point information and the environmental information;
   inferring an association between the touch point and the user based upon analyzing one or more of the touch point information, accelerometer information obtained from a user device associated with the user, or the environmental information;
   distinguishing input received from the user relative to other users of the surface-based computing environment;
   identifying a fingerprint based on the touch point information;
   determining whether the fingerprint is associated with the user;
   associating the fingerprint with a new user when the fingerprint is unassociated with the user to enable distinguishing the touch point from other touch points generated by the other users interacting with the surface;
   acquiring overhead environmental information using overhead optical sensors;
   ascertaining movements of the user based on the overhead environmental information;

determining a line of sight of the user using the optical imaging sensors;

applying one or more thresholds to an image when the image is included in the touch point information; and applying, based on a context of the surface, weightings to the touch point information and to the environmental information.

17. The method of claim 16, in which analyzing the touch point and the environmental information comprises applying weightings to the information in accordance with a context of the surface.

18. One or more computer readable media not consisting of signals, the one or more computer readable media including instructions executable by one or more processors to perform acts comprising:

obtaining touch point information associated with a touch point generated by a user interacting with a surface of a surface-based computing environment;

determining a vector of incidence of a touch point based on at least one of the touch point, an image of objects and shadows immediately above the surface, or a shape of the touch point;

collecting environmental information acquired by one or more environmental sensors that monitor the surface;

analyzing the touch point information and the environmental information;

inferring an association between the touch point and the user based upon analyzing one or more of the touch point information, accelerometer information obtained from a user device associated with the user, or the environmental information;

distinguishing input received from the user relative to other users of the surface-based computing environment;

identifying a fingerprint based on the touch point information;

determining whether the fingerprint is associated with the user;

associating the fingerprint with a new user when the fingerprint is unassociated with the user to enable distinguishing the touch point from other touch points generated by the other users interacting with the surface;

acquiring overhead environmental information using overhead optical sensors;

ascertaining movements of the user based on the overhead environmental information;

determining a line of sight of the user using the optical imaging sensors;

applying one or more thresholds to an image when the image is included in the touch point information; and applying, based on a context of the surface, weightings to the touch point information and to the environmental information.

19. The system of claim 1, wherein the vector of incidence of the touch point is determined based on at least one of the touch point on the at least one surface, an image of objects and shadows immediately above the at least one surface, or a shape of the touch point.

20. The system of claim 1, further comprising at least one range finder device to:

detect when one or more users of the plurality of users approaches the at least one surface; and determine a location of the one or more users relative to the at least one surface.

* * * * *